Patented Feb. 20, 1934

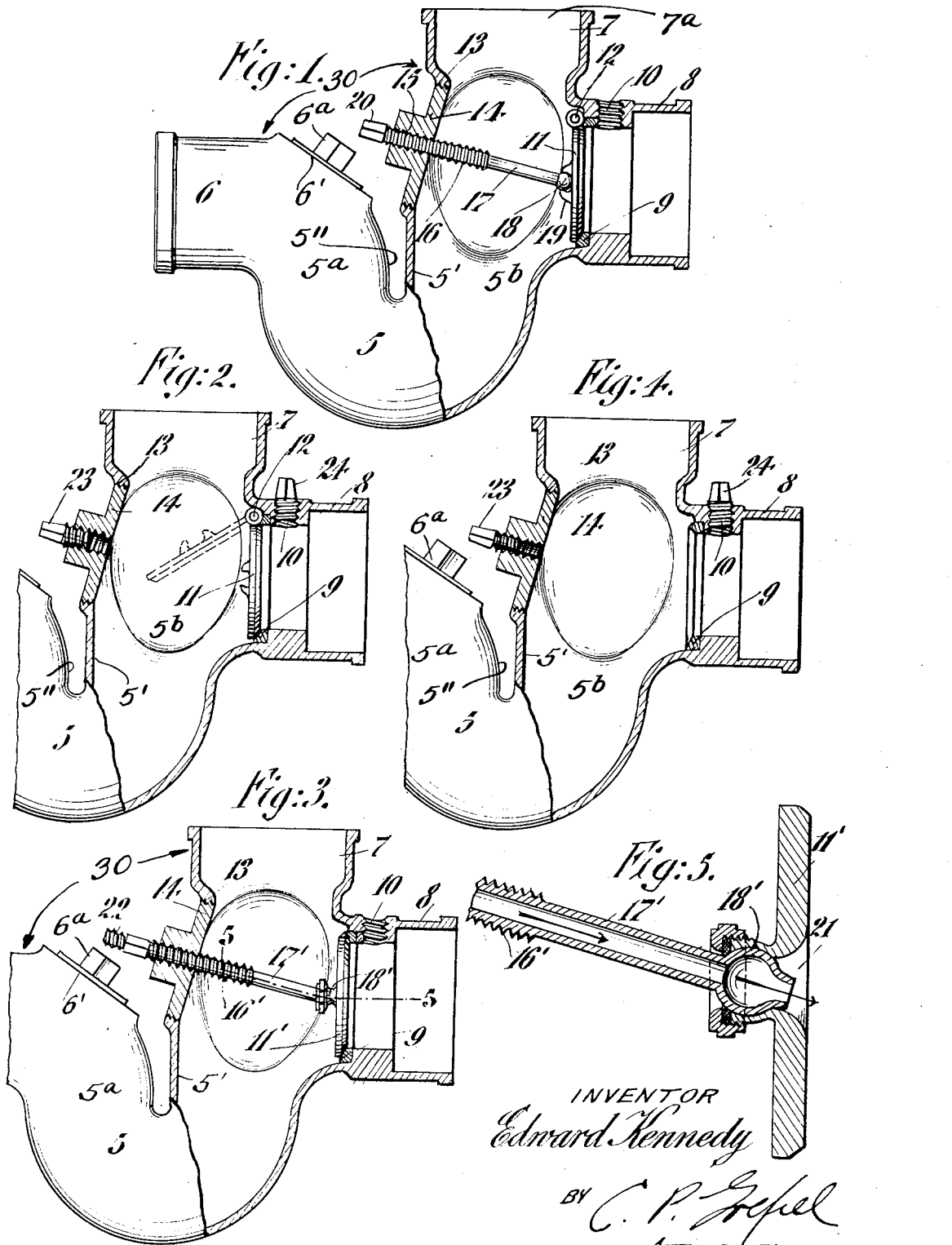

1,948,220

UNITED STATES PATENT OFFICE 1,948,220

HOUSE TRAP

Edward Kennedy, New York, N. Y.

Original application February 21, 1929, Serial No. 341,710. Patent No. 1,875,615, dated September 6, 1932. Divided and this application August 13, 1932. Serial No. 628,636

1 Claim. (Cl. 182—7)

This invention relates to an improved trap for house plumbing, and has for its general object and purpose to provide a trap construction which is especially intended to be used for the purpose of testing the plumbing system.

The invention has for its primary object and purpose to provide an improved construction of the trap body having closely related vertical leg portions each provided with a clean-out opening, one of said leg portions being further formed with a hub extension for connection with the house piping and a fresh-air inlet connection above said hub extension and clean-out opening. The hub extension at its inner end is provided with a valve seat upon which a testing valve is adapted to engage to temporarily close communication between the trap body and the house piping.

It is a further general object of the invention to provide a house trap as above characterized which may be inexpensively produced in the form of a one-piece casting, will occupy little space, and which enables the proper testing of the plumbing system to be made with ease and facility.

The present application constitutes a division of the subject matter disclosed in my pending application for patent, Serial No. 341,710, filed February 21, 1929, and since issued as Patent Number 1,875,615 of September 6, 1932.

With the above and other objects in view the invention consists in the improved house trap and in the form, construction and relative arrangement of its several parts, as will be hereinafter more fully described, illustrated in the accompanying drawing and subsequently incorporated in the subjoined claim.

In the drawing wherein I have illustrated one simple and practical embodiment of my improved trap together with several forms of testing valves which may be used in connection therewith, and in which similar reference characters designate corresponding parts throughout the several views, Fig. 1 is a side elevation partly in section, illustrating one practical embodiment of the invention.

Fig. 2 is a similar view, the valve adjusting means being removed, and the valve shown in dotted lines in open position.

Fig. 3 is a similar view showing a slightly modified form of the invention.

Fig. 4 is a sectional view of the constructon illustrated in Fig. 3, the valve, together with the adjusting means therefor, having been removed from the trap.

Fig. 5 is an enlarged detail section taken on the line 5—5 of Fig. 3.

Refering in detail to the drawing, the trap body, generally indicated at 5 is of U-shaped form having the closely related substantially parallel upwardly extending legs 5' and 5a respectively. The leg 5a is formed with a lateral hub extension 6 for connection with the sewer outlet and is further provided at its upper end with an obliquely inclined wall having a clean-out opening as indicated at 6', which may be closed by suitable plug 6a. The other leg 5' of the trap body extends above the leg 5a and at its upper end is formed with the hub 7 for a fresh-air inlet connection. Below this hub 7, the leg 5' is formed at its outer side with a lateral hub extension 8 for connection with the house piping. This hub extension is provided internally thereof and at its inner end with the valve seat 9 and preferably with a threaded opening 10 in the upper side of the hub wall adjacent to said valve seat. This opening is normally closed by means of a suitable plug.

For the purpose of testing the plumbing system, in the construction shown in Fig. 1, I have illustrated a flap valve 11 pivoted at the upper side of the valve seat 9 as indicated at 12.

The wall of the trap opposite to the valve seat 9 is preferably obliquely inclined and provided with a threaded opening indicated at 13 to receive the closure plate 14. This plate is centrally provided with an external hub extension and a threaded bore 15. This bore receives the threaded section 16 of the valve adjusting rod 17. This rod at its inner end terminates in a semi-spherical head 18 which is removably engaged in a concave seat 19 centrally formed on the face of the flap valve 11. At its outer end, the rod 17 has a square or rectangular section 20 for the application of a wrench thereto. It will be apparent that by the adjustment of this rod in the plate 14, the valve 11 may be forced tightly upon its seat to prevent any flow of the water from the house piping through the trap 5.

In the use of the above device, in making the test after the trap has been installed, the valve 11 is first forced tightly to its closed position against the seat 9. The faucets are then opened permitting the water to run freely and fill the entire piping system. When the water collects above the basin drains and overflows through the opening 10, the system is full. Such overflow indicates that the pipe lines are free of obstruction. The faucets are then closed and the valve adjusting rod 17 is unthreaded from its connection with the plate 14 and entirely removed. The water pressure immediately forces valve 11 to the open position indicated in dotted lines in Fig. 2 of the drawing so that the water may freely drain from the house piping through the trap 5 into the sewer.

In the above embodiment of the invention, the valve 11 is permanently mounted in the trap, and being comparatively light in weight will readily swing to the open position upon any appreciable pressure of water against the same from the house piping. However, in the event of back pressure through the sewer connection and the trap, such water pressure will act against the opposite side of the valve and force the same to its closed position, thereby preventing such backing up of the water extending through the house piping, and possibly flooding the premises.

It will be noted from the drawing that they represent a one-piece casting house trap comprising a U-shaped body having substantially parallel legs 5a and 5b, with the inner adjacent walls 5' and 5" thereof substantially parallel, a sewer piping hub extension 6 is shown at right angles to one leg 5a of the U, and a valved house piping hub extension 8 is substantially at right angles to the other leg 5b of the U, both extensions being on the outer walls of the U-shaped body and substantially in horizontal line with each other; a fresh air inlet hub extension 7 on the latter leg extends above both hub extensions 6 and 8 and in registration with the bore 7a of the leg of the U adjacent the house piping hub extension 8; threaded clean-out-opening closure plugs 6a and 14 are within the adjacent inner walls 5' and 5" of the U-shaped body substantially flush with the walls thereof, inclined to legs 5a and 5b and to the sewer pipe and house piping hub extensions 6 and 8, and inclined toward each other and arranged opposite each other and substantially in horizontal line with each other within the bite 30 of the U, whereby both plugs and openings therefor are within the bite of the U, but either plug 6a or 14 may be removed without conflicting with the other plug.

In Figs. 3, 4 and 5 of the drawing, I have shown an alternative embodiment of the device not having the feature last described, and in which the valve, as well as its adjusting means are removed from the trap, after the test is completed. In this case, the valve plate or disc 11' at the center thereof has a universal swivel connection with the adjusting member 17'. As herein shown, this connection is in the form of a conventional ball and socket joint 18'. Preferably, the member 17' is in the form of a rigid metal tube or conduit having the threaded portion 16' for engagement in the opening in the plate 14 in the manner above described, said conduit having one open end thereof at the ball and socket connection 18' disposed within the opening 21 of the valve disc or plate 11'. To the other end of the combined adjusting and conduit member 17', a tube or other connection indicated at 22 from a source of water under pressure is adapted to be coupled.

In the use of this form of the invention, the plate 14 is first threaded upon the section 16' of the conduit member 17' and the valve disc 11' is then inserted through the opening 13 in the trap wall and engaged with the seal 9. The plate 14 is then adjusted and threaded into the opening 13, after which the member 17' is adjusted in said plate to force the valve disc 11' tightly against the seat 9, thus effectually sealing the connection between the trap and the house plumbing. Water under pressure is then admitted through the tube connection 22 and the member 17' and through valve 11' to the house piping, said supply being continued until the water rises above the drains of the plumbing fixtures or overflows through the opening 10. Thus this device may be employed for testing purposes before the water supply piping and the faucets have been installed. After the test is completed, the plate 14 is then unthreaded from the wall of the trap so that the valve disc 11' together with the adjusting member 17' therefor can be withdrawn through the opening 13. Plate 14 is then detached from the member 17' and again threaded into the opening 13. The central bore in this plate is closed by means of a suitable plug shown at 23, and as indicated in Fig. 2 of the drawing, the opening 10 is closed by means of a similar plug 24.

In the above description I have referred to several different forms of testing valves which may be used in connection with my improved trap body. It will be understood however, that the invention herein consists primarily in the particular construction of said trap body having the fresh-air inlet connection 7 substantially in alinement with the leg 5' of the trap and the opening 13 in the wall of said leg serving the dual purpose of affording accessibility to the interior of the trap body for the purpose of cleaning same and also permitting of the easy application of a testing valve to the seat 9, or its removal therefrom after the test has been completed. Therefore, it is to be understood that the illustration in the accompanying drawing of several desirable forms of testing valve is merely suggestive, and various other valve constructions may be used. It will also be evident that in order to meet certain exigencies which might arise, detail changes in form in the various parts of the trap body may be necessary. It is, therefore, to be understood that in practice, I reserve the privilege of adopting all such legitimate changes in the form, construction and relative arrangement of the several detail parts of my present disclosure, as may be fairly embodied within the spirit and scope of the invention as claimed.

I claim:

A one-piece casting house trap comprising a U-shaped body having closely spaced substantially parallel legs, the legs being aligned in one plane, a sewer piping hub extension at right angles to one leg of the U, a valved house piping hub extension substantially at right angles to the other leg of the U, both extensions being on the outer walls of the U-shaped body and substantially in horizontal line with each other, a fresh air inlet hub extension on the latter leg and extending above both hub extensions and in registration with the bore of the leg of the U adjacent the house piping hub extension, and threaded clean-out opening closure plugs within the adjacent inner walls of the U-shaped body substantially flush with the walls thereof and forming a continuous wall with the wall of the leg to which the closure plug is applied, said plugs being inclined to the legs and to the sewer pipe and house piping hub extensions, and to each other and arranged opposite to each other and substantially in horizontal line with each other within the bight of the U, whereby both plugs and openings therefor are within the bight of the U, but either plug may be removed without conflicting with the other plug.

EDWARD KENNEDY.